United States Patent
Noda et al.

(10) Patent No.: US 6,968,399 B2
(45) Date of Patent: Nov. 22, 2005

(54) TRANSMISSION/RECEPTION APPARATUS, TRANSMISSION/RECEPTION METHOD, AND TRANSMISSION/RECEPTION SYSTEM

(75) Inventors: Takuro Noda, Tokyo (JP); Makoto Sato, Tokyo (JP); Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/492,508

(22) PCT Filed: Oct. 16, 2002

(86) PCT No.: PCT/JP02/10741

§ 371 (c)(1),
(2), (4) Date: Apr. 13, 2004

(87) PCT Pub. No.: WO03/034686

PCT Pub. Date: Apr. 24, 2003

(65) Prior Publication Data

US 2004/0252715 A1 Dec. 16, 2004

(30) Foreign Application Priority Data

Oct. 16, 2001 (JP) .............................. 2001-318419
Sep. 19, 2002 (JP) .............................. 2002-273812

(51) Int. Cl.$^7$ .............................................. G06F 3/00
(52) U.S. Cl. .................. 710/5; 710/8; 710/11; 359/350
(58) Field of Search .................. 710/5, 8, 11; 359/350

(56) References Cited

U.S. PATENT DOCUMENTS 5,349,649 A * 9/1994 Iijima ......................... 709/228
5,546,211 A * 8/1996 Devon ......................... 398/98

FOREIGN PATENT DOCUMENTS

| EP | 0 859 323 | 8/1998 |
| JP | 10-290247 | 10/1998 |
| JP | 11-164357 | 6/1999 |
| JP | 2000-3323 | 1/2000 |

* cited by examiner

Primary Examiner—Jeffrey Gaffin
Assistant Examiner—Justin Knapp
(74) Attorney, Agent, or Firm—Frommer Lawrence & Haug LLP; William S. Frommer; Darren M. Simon

(57) ABSTRACT

Information on the protocols supported by a target device and the address thereof are acquired by a simple operation, and communication is performed using a supported protocol. A device (1) 1 includes: a non-contact IC interface 2, which requests supported protocol information 8 of a device (2) 4 within a predetermined communication area in a network, and which acquires supported protocol information 8 from the device (2) 4; an IEEE 802.11b interface 3, which performs transmission signal processing and reception signal processing; test communication element, which performs test communication using the IEEE 802.11b interface 3; and communication element which, when test communication using the test communication element is possible, performs communication using a protocol of the protocol information 8 acquired by the protocol acquisition element.

14 Claims, 11 Drawing Sheets

```
<protocol>
  <upnp>
    <uuid>1003d00-0040-0000-0000-000080000001</uuid>
  </upnp>
</protocol>
```

```
<protocol>
  <bluetooth>
    <bd_addr>0100000127b35</bd_addr>
  </bluetooth>
  <upnp>
    <uuid>0518003d-030a-000a-1ec0-008700004000</uuid>
  </upnp>
</protocol>
```

31 — bluetooth section
32 — upnp section

FIG. 4

```
41  <protocol priority=1>
42    <bluetooth>
         <bd_addr>010000127b35</bd_addr>
      </bluetooth>
    </protocol>
43  <protocol priority=2>
44    <upnp>
         <uuid>0518003d-030a-000a-1ec0-008700004000</uuid>
      </upnp>
    </protocol>
45  <protocol priority=3>
46    ......
      ......
```

FIG. 9

```
<accessPoint>
  <title>local-net </title>
  <802.11b>
    <essid>0000 </essid>
    <wepkey>sampl </wepkey>
  </802.11b>
</accessPoint>
```

91

TRANSMISSION/RECEPTION APPARATUS, TRANSMISSION/RECEPTION METHOD, AND TRANSMISSION/RECEPTION SYSTEM

TECHNICAL FIELD

This invention relates to a transmission and reception device, a transmission and reception method, and a transmission and reception system which, for example, receive transmitted information and also output received signals.

BACKGROUND ART

In the past, when an inquiry is made from an electronics device comprising, for example, a Bluetooth wireless communication block, to peripheral devices, the following processing is performed.

The master enters the transmission (TX) state through the transfer of packets for inquiry at every, for example, 312.5 µsec, and 625 µsec after the time of this transmission, makes a transition from the transmission (TX) state to the reception (RX) state in order to receive packets for response to inquiries.

The slave enters the reception (RX) state in order to receive a packet for an inquiry from the master during a period of, for example 11.25 msec, and 1.28 sec after the time of this reception enters the transmission (TX) state in order to transmit a packet in response to the inquiry, or enters the next reception (RX) state. By means of this inquiry, the master can acquire the address BDADDR within the network from the slave.

DISCLOSURE OF THE INVENTION

In the above-described technology of the prior art, as a result of the sending by a master of inquiries to a plurality of slaves, there is the disadvantage that a certain amount of time is required for the selection of a piconet or scatternet, or for operation to acquire an address BDADDR within the network.

When a master sends an inquiry to a plurality of slaves, it is assumed that the target device comprises a wireless communication block conforming to Bluetooth; hence when the target device supports another protocol, there is the disadvantage that the master cannot acquire the address BDADDR in the network from the slave.

The present invention was devised in light of these problems, and has as an object to provide a transmission and reception device, transmission and reception method, and transmission and reception system which, through simple operation, can acquire information on the protocols supported by the target device and the target device address, and can perform communication using a supported protocol.

A transmission and reception device of this invention performs transmission signal processing of input signals to transmit the signals from a transmission device within the network, and performs reception signal processing of signals received in a reception device within the network to output the signals; and the transmission and reception device comprises: protocol request means, which requests supported protocol information of a reception device within a predetermined communication area in the network; protocol acquisition means, which acquires supported protocol information from a reception device; interface means, which performs transmission signal processing and reception signal processing; test communication means, which performs test communication using the interface means; and communication means, which, when test communication is possible using the test communication means, performs communication using a protocol of the protocol information acquired by the protocol acquisition means.

A transmission and reception method of this invention performs transmission signal processing of input signals to transmit the signals from a transmission device within the network, and performs reception signal processing of signals received in a reception device within the network to output the signals; and the transmission and reception method comprises: a protocol request step of requesting supported protocol information of a reception device within a predetermined communication area in the network; a protocol acquisition step of acquiring supported protocol information from a reception device; an interface step of performing transmission signal processing and reception signal processing; a test communication step of performing test communication using the interface step; and a communication step of, when test communication is possible using the test communication step, performing communication using a protocol of the protocol information acquired by the protocol acquisition step.

Further, a transmission and reception system of this invention performs transmission signal processing of input signals to transmit the signals from a transmission device within the network, and performs reception signal processing of signals received in a reception device within the network to output the signals; and the transmission and reception system comprises: a transmission device having protocol request means which requests supported protocol information of a reception device within a predetermined communication area in the network; protocol acquisition means, which acquires supported protocol information from a reception device; interface means, which performs transmission signal processing and reception signal processing; test communication means, which performs test communication using the interface means; and communication means, which, when test communication is possible using the test communication means, performs communication using a protocol of the protocol information acquired by the protocol acquisition means; and a reception device having storage means which stores supported protocol information; protocol transfer means, which transfer supported protocol information to a transmission device within a predetermined communication area in the network; interface means, which performs transmission signal processing and reception signal processing; and communication means, which performs communication using a protocol the protocol information for which is stored by the storage means. Therefore, according to this invention, the following operations are performed.

The transmission device requests, of a reception device within a predetermined communication area in the network, a protocol list which describes supported protocols.

The protocol list of a reception device describes supported protocol information. The reception device transfers a protocol list describing supported protocol information to a transmission device within a predetermined communication area in the network, via the protocol transfer means.

The transmission device acquires the protocol list describing supported protocol information from the reception device, via the protocol acquisition means. The transmission device performs transmission signal processing and reception signal processing via the interface means. The transmission device performs test communication using the interface means, via the test communication means. When test communication is possible, the transmission device performs communication, via the communication means, using a protocol of the protocol information described in a protocol list obtained by the protocol acquisition means.

The reception device performs transmission signal processing and reception signal processing via the interface means. The reception device performs communication, via the communication means, using a protocol of the protocol information described in the protocol list.

According to the above configuration, through protocol information supported by a reception device, the protocol of an interface means capable of test communication among all interface means is used by the transmission device to perform communication with the interface means of the reception device.

BRIEF DESCRIPTION OF DRAWINGS

FIG. 3 shows a script file which describes the supported protocol information for device 2;

FIG. 4 shows another script file which describes the supported protocol information for device 2;

FIG. 9 shows a script file of parameters for access point connection to the network;

BEST MODE FOR CARRYING OUT THE INVENTION

Hereinafter, embodiments of the present invention will be explained.

In a transmission and reception system to which this embodiment is applied, when each of two arbitrary devices supports a plurality of protocols, it is possible to automatically select and perform communication using the optimum protocol in the order of preferred use, by describing in advance the protocols of each device.

[Communication System]

Figures 1, 2:
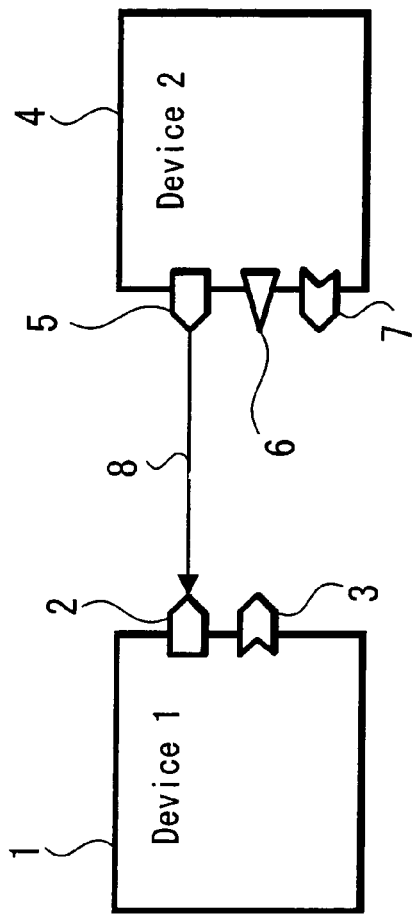
FIG. 1 shows the configuration of a communication system to which an embodiment of the present invention is applied.
FIG. 2 shows a script file which describes the supported protocol information for device 1.

FIG. 1 shows the configuration of a communication system to which the embodiment of the present invention is applied.

In FIG. 1, the device (1) 1 has a non-contact IC (integrated circuit) interface 2 capable of contact-free acquisition of protocol 8, and an IEEE 802.11b interface 3 capable of wireless communication conforming to the IEEE 802.11b standard. The device (2) 4 has a non-contact IC interface 5 capable of contact-free transmission of protocols 8, a (Bluetooth) interface 6 capable of wireless communication conforming to the Bluetooth standard, and an IEEE 802.11b interface 7 capable of wireless communication conforming to the IEEE 802.11b standard.

Further, this communication system is applied in a communication system in which are performed transmission signal processing by the device (1) within the network and transmission of input signals therefrom, as well as reception signal processing and output of signals received in the device (2) 4 within the network.

Here, the device (1) 1 has a non-contact IC interface 2 which requests supported protocol information 8 of the device (2) 4 within a predetermined communication area in the network and acquires supported protocol information 8 from the device (2) 4; an IEEE 802.11b interface 3 which performs transmission signal processing and reception signal processing; test communication means which performs test communication using the IEEE 802.11b interface 3; and communication means which, when test communication is possible, performs communication using a protocol of the protocol information acquired by the non-contact IC interface 2.

The device (2) 4 has storage means which stores supported protocol information 8; a non-contact IC interface 2 which transfer supported protocol information 8 to device (1) 1 within a predetermined communication area in the network; a Bluetooth interface 6 and IEEE 802.11b interface 7 which perform transmission signal processing and reception signal processing; and communication means which performs communication using a protocol of the protocol information 8 stored in the storage means.

The operation of a communication system configured as described above is explained below.

In FIG. 1, the non-contact IC interface 2 of the device (1) 1 requests supported protocol information 8 from the device (2) 4 within a predetermined communication area in the network.

The storage means of the device (2) 4 stores supported protocol information 8. Then, the non-contact IC interface 5 of the device (2) 4 transfers the supported protocol information 8 to the device (1) 1 within the predetermined communication area in the network.

The non-contact IC interface 2 of the device (1) 1 acquires the supported protocol information 8 from the device (2) 4. The IEEE 802.11b interface 3 of the device (1) 1 performs transmission signal processing and reception signal processing. The test communication means of the device (1) 1 performs test communication using the IEEE 802.11b interface 3. The communication means of the device (1) 1, when test communication is possible, performs communication through the non-contact IC interface 2, using a protocol of the acquired protocol information.

The Bluetooth interface 6 or IEEE 802.11b interface 7 of the device (2) 4 performs transmission signal processing and reception signal processing. The communication means of the device (2) 4 performs communication using a protocol of the protocol information 8 stored in the storage means.

As a result, through the protocol information 8 supported by the device (2) 4, the communication means of the device (1) 1 can perform communication with the IEEE 802.11b interface 7 of the device (2) 4, using the protocol of the IEEE 802.11b interface 3 which, between the Bluetooth interface 6 and the IEEE 802.11b interface 7, has been capable of test communication using the test communication means of the device (1) 1.

[Protocol Script File]

FIGS. 2 and 3 show script files, stored in the non-contact IC cards of the non-contact IC interface 2 of device (1) 1 and of the non-contact IC interface 5 of device (2) 4, for protocols supported by the respective devices.

In FIG. 2, the script file for protocols supported by the device (1) 1 is configured as follows.

First, the <protocol> element indicates that information related to protocols is described therein. Next, as indicated by numeral 21, the <upnp (universal network protocol)> element indicates that the device (1) 1 is a device supporting a protocol which operates on Ethernet® conforming to the IEEE 802.3 standard, and has a network address of <uuid>1003d00-0040-0000-0000-000080000001. Hence using this <upnp> protocol, communication via Ethernet® conforming to the IEEE 802.3 standard is possible.

In FIG. 3, the script file for protocols supported by the device (2) 4 is configured as follows.

First, the <protocol> element indicates that information related to protocols is described therein. Next, as indicated by numeral 31, the <bluetooth> element indicates that the device (2) 4 is a device supporting a protocol conforming to the Bluetooth standard, and has a network address of <bd_addr>010000127b35.

Also, as indicated by numeral 32, the <upnp> element indicates that the device (2) 4 is a device supporting a protocol which operates on Ethernet®conforming to the IEEE 802.3 standard, and has a network address of <uuid>0518003d00-030a-000a-1ec0-008700004000. Hence using this <upnp> protocol, communication via Ethernet® conforming to the IEEE 802.3 standard is possible.

Here, in the <protocol> element, it is indicated that the <bluetooth> element denoted by 31 and appearing first has higher priority than the <upnp> element denoted by 32 and appearing later. Consequently it is possible to switch from a high-priority protocol to a low-priority protocol and use the optimum protocol for communication.

The <bd_addr> within the <bluetooth> element denoted by 31 and described above, and the <uuid> within the <upnp> element denoted by 32, are parameters necessary for investigating the identity of a device using the respective protocols.

FIG. 4 shows another script file, stored in a non-contact IC card of the non-contact IC interface 5 of the device (2) 4, of protocols supported by the device.

In FIG. 4, the other script file of protocols supported by the device (2) 4 is configured as follows.

First, as denoted by numeral 41, the <protocol priority=1> element indicates that information relating to protocols with the priority 1, which is the highest priority, is written therein. Next, as denoted by 42, the <bluetooth> element indicates that the device (2) 4 is a device supporting a protocol which conforms to the Bluetooth standard, and that the device has <bd_addr>010000127b35 as the address on this network.

Further, as denoted by 43, the <protocol priority=2> element indicates that information relating to protocols with the priority 2, which is the second-highest priority, is written therein. Next, as denoted by 44, the <upnp> element indicates that the device (2) 4 is a device supporting a protocol which operates on Ethernet® conforming to the IEEE 802.3 standard, and has a network address of <uuid>0518003d00-030a-000a-1ec0-008700004000. Hence using this <upnp> protocol, communication via Ethernet® conforming to the IEEE 802.3 standard is possible.

As denoted by 45, the <protocol priority=3> element indicates that information relating to protocols with the priority 3, which is the third-highest priority, is written therein. Then, as denoted by 46, the < . . . > elements indicate that the device (2) 4 is a device supporting the protocols . . . , and has the addresses < . . . > on those networks.

Here, smaller numbers written as n in an element <protocol priority=n (a positive integer: 1, 2, 3 . . . )> indicate a higher priority. Consequently switching from higher-priority protocols to lower-priority protocols is possible in order to perform communication using the optimum protocol.

The <bd_addr> within the <bluetooth> element denoted by 42 and described above, and the <uuid> within the <upnp> element denoted by 43, are parameters necessary for investigating the identity of a device using the respective protocols.

[Timing Chart Describing Operation]

Figure 5:
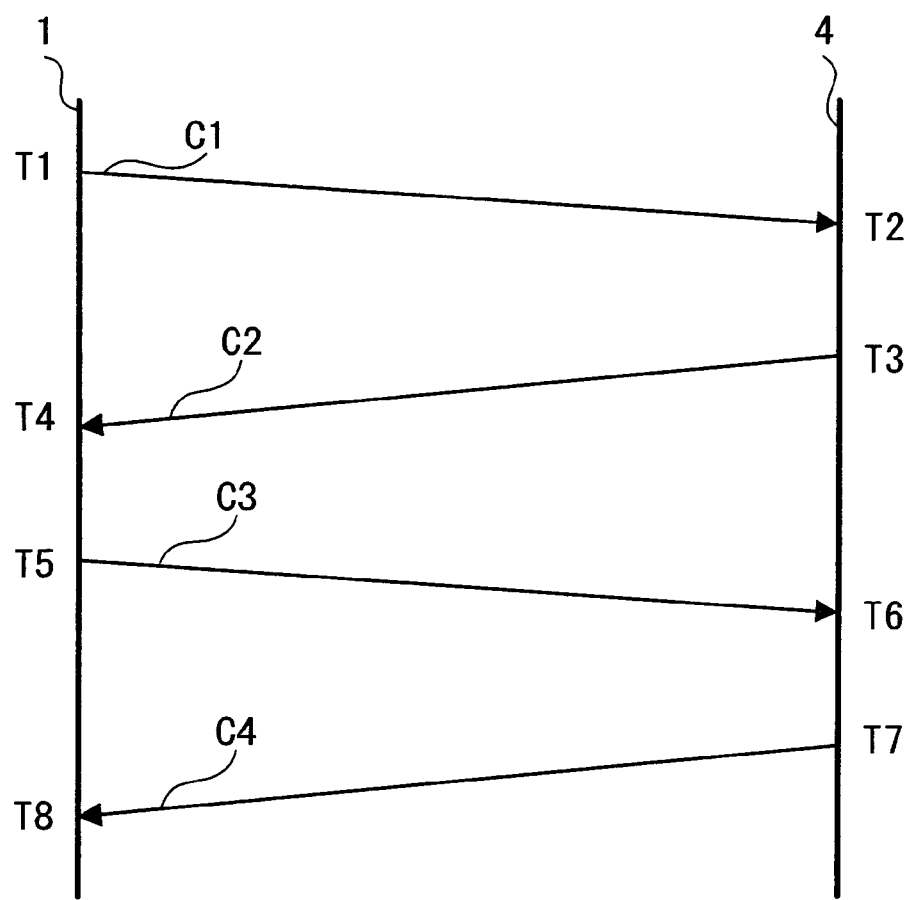
FIG. 5 is a timing chart indicating operation.
Figure 5:
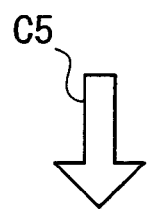

FIG. 5 is a timing chart indicating operation.

In FIG. 5, the device (1) 1 requests a protocol list from the device (2) 4 at time T1, as indicated by C1. At time T2, the device (2) 4 receives the protocol list request from the device (1) 1. At time T3, the device (2) 4 transfers the protocol list to the device (1) 1, as indicated by C2. Then, at time T4, the device (1) 1 receives the protocol list from the device (2) 4.

At time T5, the device (1) 1, by performing test communication, investigates whether communication with the device (2) 4 is possible using the protocol <upnp>, as indicated by C3. At time T6, the device (2) 4 receives a test communication using the protocol <upnp> from the device (1) 1. At time T7, the device (2) 4 returns to the device (1) 1 an acknowledgment signal (ACK) indicating that test communication from the device (1) 1 using the <upnp> protocol was possible (OK), as indicated by C4. Then, at time T8, the device (1) 1 receives the acknowledgment signal (ACK) from the device (2) 4.

Accordingly, subsequent to time T8 the device (1) 1 can perform communication using the <upnp> protocol with the device (2) 4, as indicated by C5.

[Acquisition of Protocol List of Device (2) 4 by Device (1) 1]

Figure 6:
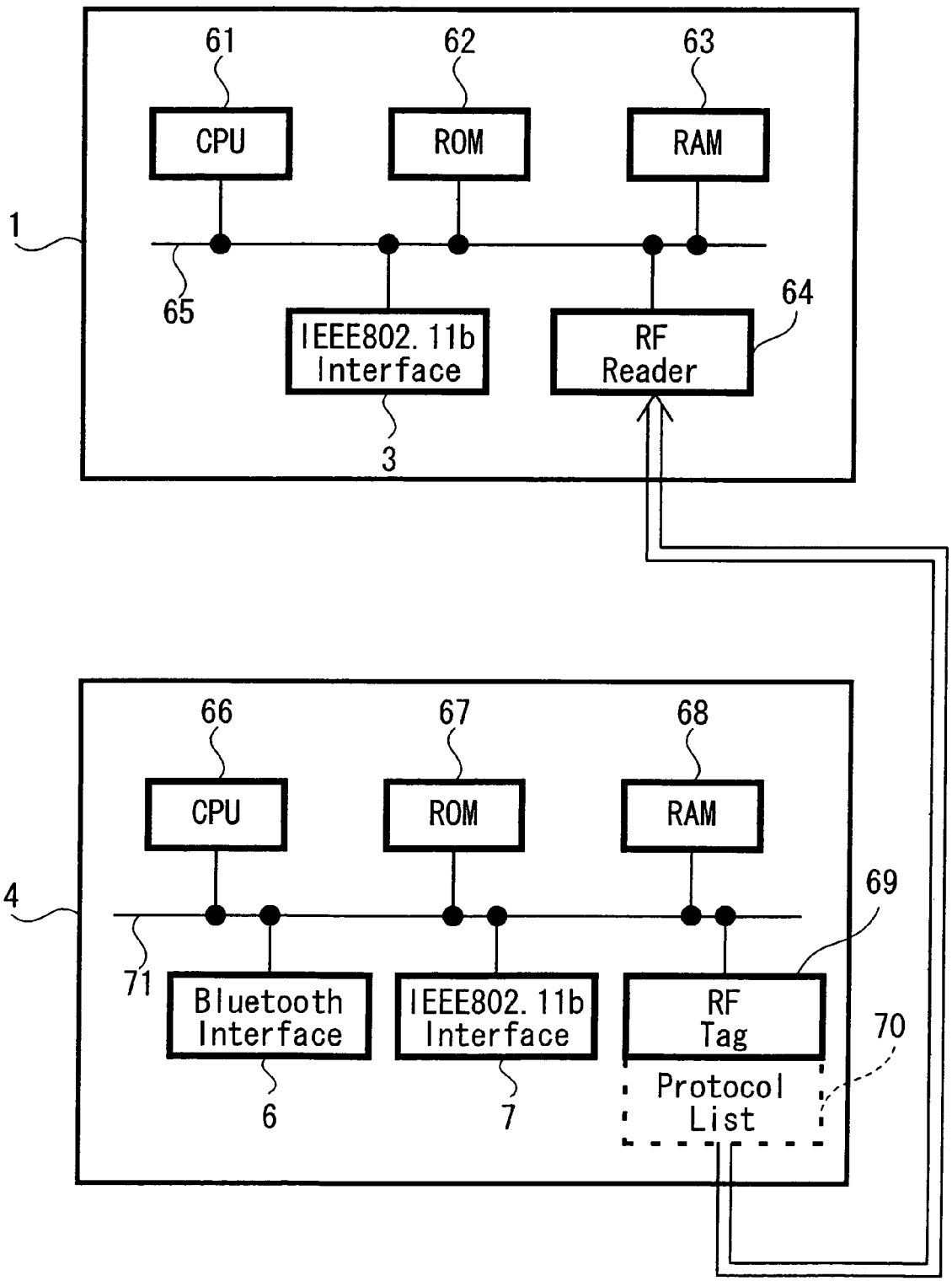
FIG. 6 shows acquisition of the protocol list of device 2 by device 1.

FIG. 6 shows acquisition of the protocol list of the device (2) 4 by the device (1) 1.

In FIG. 6, the device (1) 1 includes a CPU (central processing unit) 61 which controls the device (1) 1; ROM (read-only memory) 62 which stores the control program for the device (1) 1; RAM (random access memory) 63 which stores control data for the device (1) 1; an RF (radio frequency) reader 64 capable of acquiring in a contact-free way a protocol list 70, described below, from the device (2) 4; a bus 65; and an IEEE 802.11b interface 3, capable of wireless communication conforming to the IEEE 802.11b standard.

The device (2) 4 has a CPU 66 which controls the device (2) 4; ROM 67 which stores the control program for the device (2) 4; RAM 68 which stores control data for the device (2) 4; a protocol list 70 which describes supported protocols; an RF tag 69 which is capable of transferring in a contact-free way the protocol list 70 to the device (1) 1; a bus 71; a Bluetooth interface 6 capable of wireless communication conforming to the Bluetooth standard; and an IEEE 802.11b interface 7 capable of wireless communication conforming to the IEEE 802.11b standard.

Here, the RF reader 64 of the device (1) 1 corresponds to the non-contact IC interface 2 shown in FIG. 1. The RF tag 69 of the device (2) 4 corresponds to the non-contact IC interface 5 shown in FIG. 1.

The operation, in the device (1) 1 and the device (2) 4 configured as described above, in which the protocol list of the device (2) 4 is acquired by the device (1) 1, is explained below.

In FIG. 6, the CPU 61 in the device (1) 1 uses the RAM 63 to execute the control program stored in the ROM 62, and the CPU 66 in the device (2) 4 uses the RAM 68 to execute the control program stored in the ROM 67, to cause the following operation.

The CPU 61 of the device (1) 1 requests of the device (2) 4 in a predetermined communication area in the network, via the RF reader 64, the protocol list 70 describing supported protocol information.

The protocol list 70 of the device (2) 4 describes supported protocol information. Then, the CPU 66 of the device (2) 4 transfers, via the RF tag 69, the protocol list 70 describing supported protocol information to the device (1) within the predetermined communication area in the network.

The CPU 61 of the device (1) 1 acquires the protocol list 70 describing supported protocol information from the device (2) 4 via the RF reader 64. The CPU 61 of the device (1) 1 performs transmission signal processing and reception signal processing via the IEEE 802.11b interface. The CPU 61 of the device (1) 1 performs test communication using the IEEE 802.11b interface 3 via the test communication means. When test communication is possible, the CPU 61 of the device (1) 1 performs communication, via the communication means, using a protocol of the protocol information described in the protocol list 70 acquired by the RF reader 64.

The CPU 66 of the device (2) 4 performs transmission signal processing and reception signal processing via the Bluetooth interface 6 and the IEEE 802.11b interface 7. The CPU 66 of the device (2) 4 performs communication, via the communication means, using a protocol of the protocol information described in the protocol list 70.

Accordingly, the CPU 61 of the device (1) 1 can perform communication with the IEEE 802.11b interface 7 of the device (2) 4 between the Bluetooth interface 6 and IEEE 802.11b interface 7, using the protocol of the IEEE 802.11b interface 3 with which test communication by the CPU 61 of the device (1) 1 was possible, by means of the information on protocols supported by the device (2) 4.

[Flowchart Showing Operation]

Figure 7:
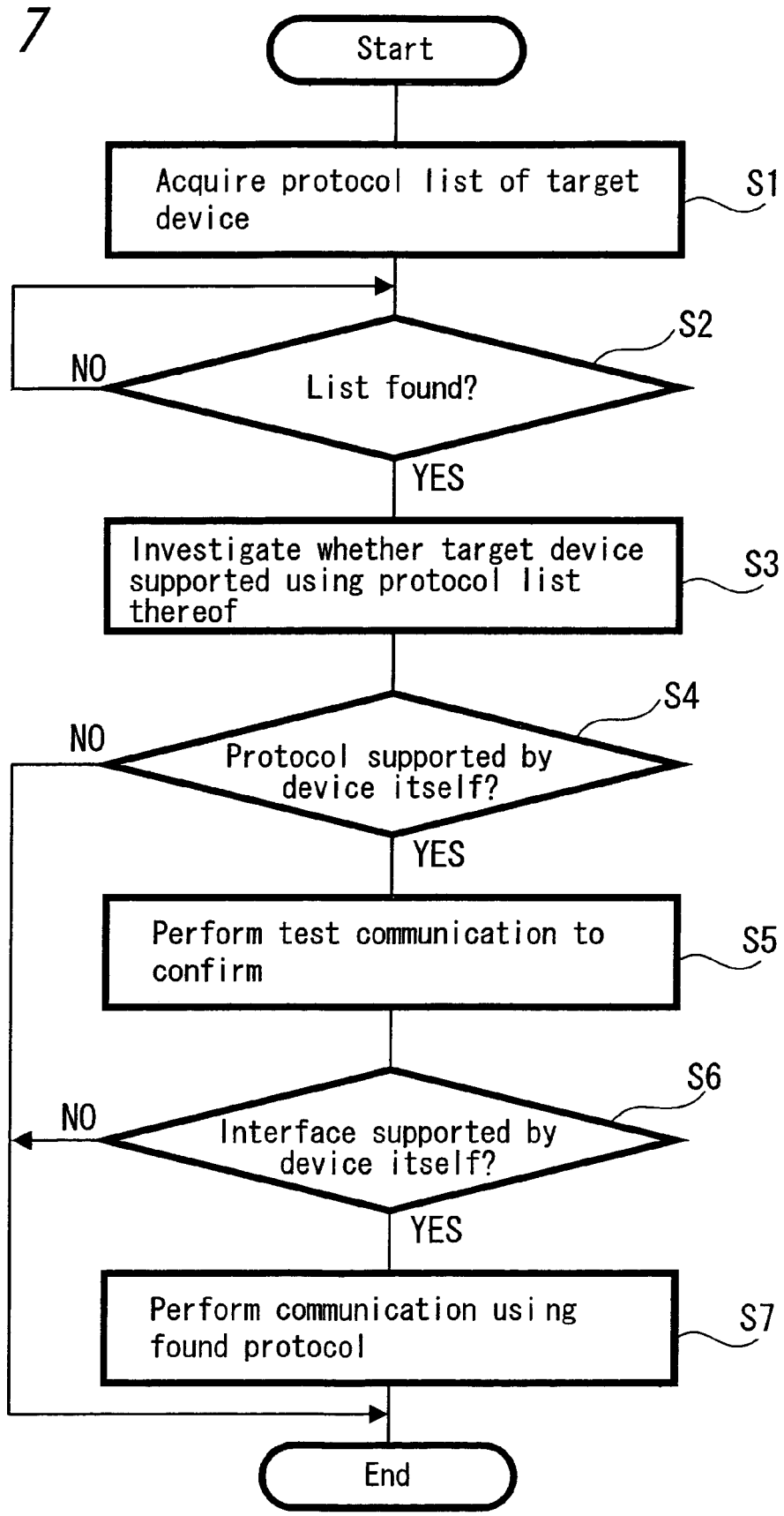
FIG. 7 is a flowchart indicating operation.

FIG. 7 is a flowchart showing operation.

In FIG. 7, in step S1 the device (1) 1 acquires the protocol list of the target device (2) 4. In step S2, the device (1) 1 judges whether the protocol list of the target device (2) 4 has been found yet. If in step S2 the protocol list of the target device (2) 4 has been found, in step S3 the device (1) 1 investigates, from the protocol list of the target device (2) 4, whether the target device (2) 4 comprises a protocol supported by the device (1) 1 itself.

In step S4, the device (1) 1 judges whether a protocol is supported by the device (1) 1 itself. If in step S4 a protocol is supported by the device (1) 1 itself, in step S5 the device (1) attempts a test communication to confirm. In step S6, it is judged whether the interface is supported by the device (1). If in step S6 the interface is supported by the device (1) itself, in step S7 the device (1) 1 performs communication with the device (2) 4, using the protocol thus found.

When in step S4 there is no protocol supported by the device itself, or when in step S6 the interface is not supported by the device itself, processing ends.

As explained above, when the device (1) 1 wishes to communicate with the device (2) 4 using another protocol, the device (1) 1 acquires the protocol information of the device (2) 4, and searches for the <upnp> element of a protocol supported by the device (1) 1. If the protocol <upnp> element is found in the protocol information of the device (2) 4, the device (1) 1 performs test communication with the <uuid> address written therein, using the IEEE 802.11b interface; if successful, subsequently the device (1) 1 can use the <upnp> protocol to perform communication with the device (2) 4.

If the protocols coincide but the interfaces do not coincide, communication may not be possible; in this case, when the device (1) 1 has another interface, the interface is changed and test communication is performed, and if communication is still not possible, the protocol is changed in order based on priority, and similar test communication is attempted using other protocols.

Here an example of scripts of the <bluetooth> element and <upnp> element protocols has been described; however this invention is not limited thereto, and application to other protocols is possible by making similar scripts and performing similar investigations.

According to the above described embodiment, by preparing an arrangement to start another protocol, assignment of protocol roles is possible; and when a device supports a plurality of protocols, by stating the order of priority thereof, the optimal protocol can be used to perform communication.

Further, only the type of protocol need be described, and the detailed rules of the respective protocols can be entrusted to the respective protocols.

In the above-described embodiment, an example is described in which an RF reader is used to read target device information described in an RF tag; however this invention is not limited thereto, and another non-contact IC interface may be used to read target device information. Below, an embodiment in which an infrared interface is used to read target device information is explained.

Figure 8:
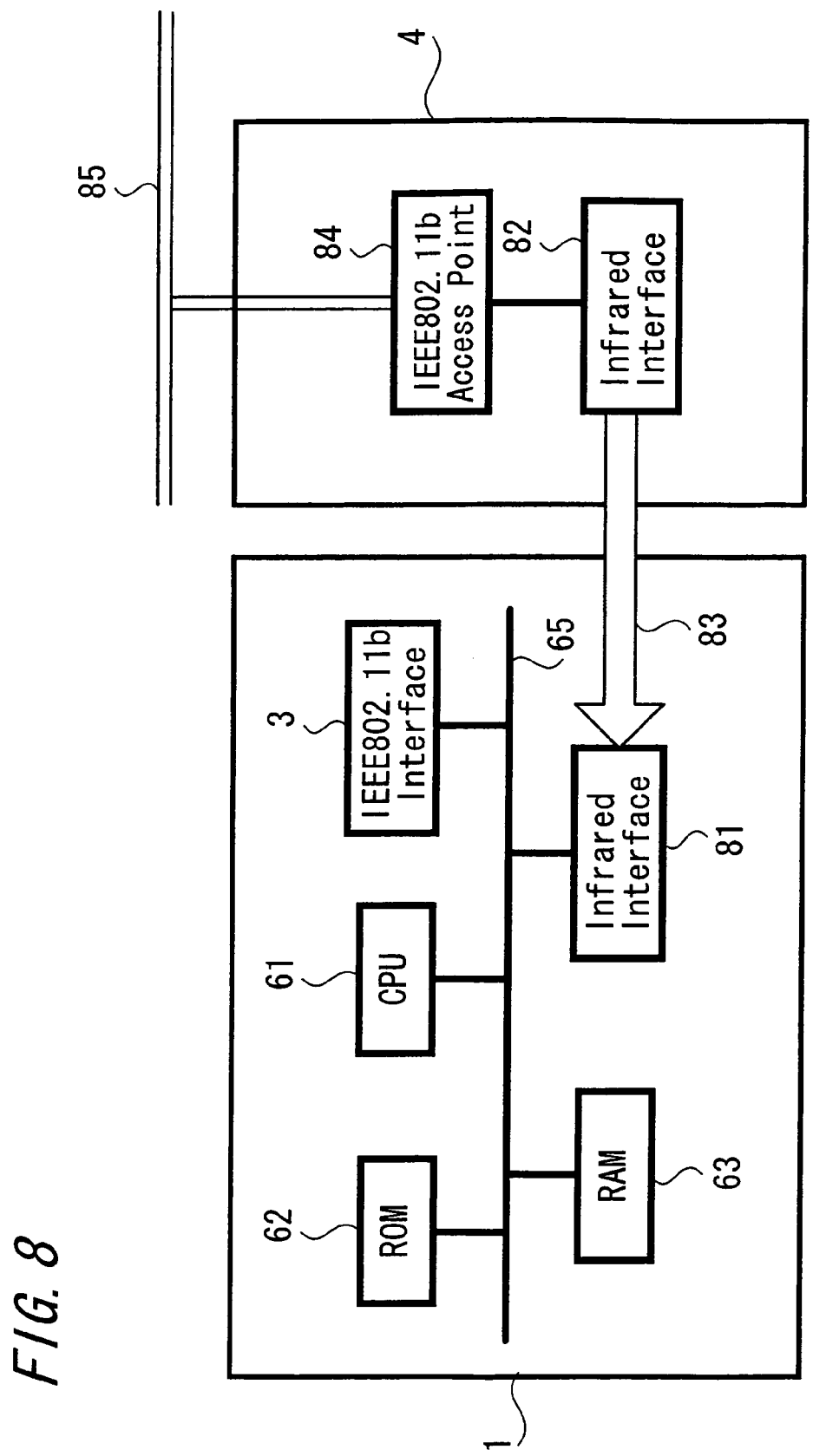
FIG. 8 shows parameter acquisition for access point connection to the network of device 2 by device 1, using an infrared interface.

FIG. 8 shows parameter acquisition for access point connection to the network of device 2 by the device 1, using an infrared interface. FIG. 8 shows an infrastructure mode in which communication with the network is performed through an access point connection to the network 85. The infrastructure mode is a mode in which a certain device performs communication with some other devices connected to the network.

In FIG. 8, the device (1) 1 includes a CPU 61 which controls the device (1) 1; ROM 62 which stores the control program for the device (1) 1; RAM 63 which stores control data for the device (1) 1; an infrared interface 81, capable of acquiring parameters 83, described below, in a contact-free way from the device (2) 4; a bus 65; and an IEEE 802.11b interface 3, capable of wireless communication according to the IEEE 802.11b standard. The device (2) 4 includes an IEEE 802.11b access point 84, capable of wireless communication with the network 85 according to the IEEE 802.11b standard, and an infrared interface 82 capable of transfer in a contact-free way of parameters 83, described below, to the device (1) 1. Here, the device (2) 4 may be a peripheral device capable of communication with the device (1) 1 via the infrared interface.

The infrared interface 81 of the device (1) 1 corresponds to the non-contact IC interface 2 shown in FIG. 1. The infrared interface 82 of the device (2) 4 corresponds to the non-contact IC interface 5 shown in FIG. 1.

In the device (1) 1 and device (2) 4 configured as described above, the operation by the device (1) 1 to acquire the parameters 83, described below, of the device (2) 4 is explained as follows.

In FIG. 8, the control program stored in the ROM 62 is executed by the CPU 61 of the device (1) 1 using the RAM 63, to perform the following operations.

The CPU 61 of the device (1) 1 requests parameters 83 describing information for access point connection to the network 85 from the device (2) 4 within a predetermined communication area, in order to connect to an access point of the network 85 via the infrared interface 81.

The parameters 83 of the device (2) 4 describe information for access point connection to the supported protocol network 85. Then, the device (2) 4 transfers the parameters 83, describing information for access point connection to the network 85, to the device (1) 1 within the predetermined communication area in the network, via the infrared interface 82.

The CPU 61 of the device (1) 1 acquires parameters describing information for access point connection to the network 85 from the device (2) 4, via the infrared interface 81. The CPU 61 of the device (1) 1 performs transmission signal processing and reception signal processing via the IEEE 802.11b interface 3. The CPU 61 of the device (1) 1 sets parameters in the IEEE 802.11b interface 3 via communication setting means. When test communication is possible via the communication means, the CPU 61 of the device (1) 1 makes communication settings of information for access point connection to the network 85 described in the parameters acquired by the infrared interface 81. The parameters 83 are information to set specific communication conditions in order to set the communication protocol.

Here, the CPU 61 of the device (1) 1 accesses the network 85 via the IEEE 802.11b access point 84 of the device (2) 4. The CPU 61 of the device (1) 1 performs communication with the network 85 via the IEEE 802.11b access point 84 of the device (2) 4. The device (2) 4 may be, for example, dialup means to a terminal device connected to the network 85. Moreover, the device (2) 4 may be, for example, an Internet browser capable of browsing the contents of a server connected to the Internet as a network 85.

By this means, communication settings are made by the CPU 61 of the device (1) 1 using parameters of the IEEE 802.11b interface 3 with which test communication was possible with the IEEE 802.11b interface 7 based on the information on parameters supported by the device (2) 4, and the CPU 61 of the device (1) 1 can perform communication with the network 85 via the IEEE 802.11b access point 84 of the device (2) 4.

[Script File of Parameters for Access Point Connection to a Network]

FIG. 9 shows a parameter script file for access point connection to the network 85, described in the non-contact IC cards of the non-contact IC interface 2 of the device (1) 1 and in the non-contact IC interface 5 of the device (2) 4.

In FIG. 9, the parameter script file for access point connection to the network 85 is configured as follows.

First, within the <accesspoint> element is written information relating to parameters for access point connection to the network 85; the title indicates a local network. Next, as indicated by numeral 91, the <802.11b> element indicates that, when the device (1) 1 performs communication conforming to the IEEE 802.11b standard via the IEEE 802.11b access point 84 of the device (2) 4, as parameters for access point connection to the network 85, <essid (service set identification)>0000 is set as a communication group identification number on the network, and <wep (wire equivalent privacy) key>sampl is set as a password setting/decoding key equivalent to telephone lines. By this means, the device (1) 1 can use the parameters 91 to connect to the network 85 and perform communication conforming to the IEEE 802.11b standard via the IEEE 802.11b access point 84 of the device (2) 4.

[Flowchart Showing Parameter Acquisition Operation for Access Point Connection to Network]

Figure 12:
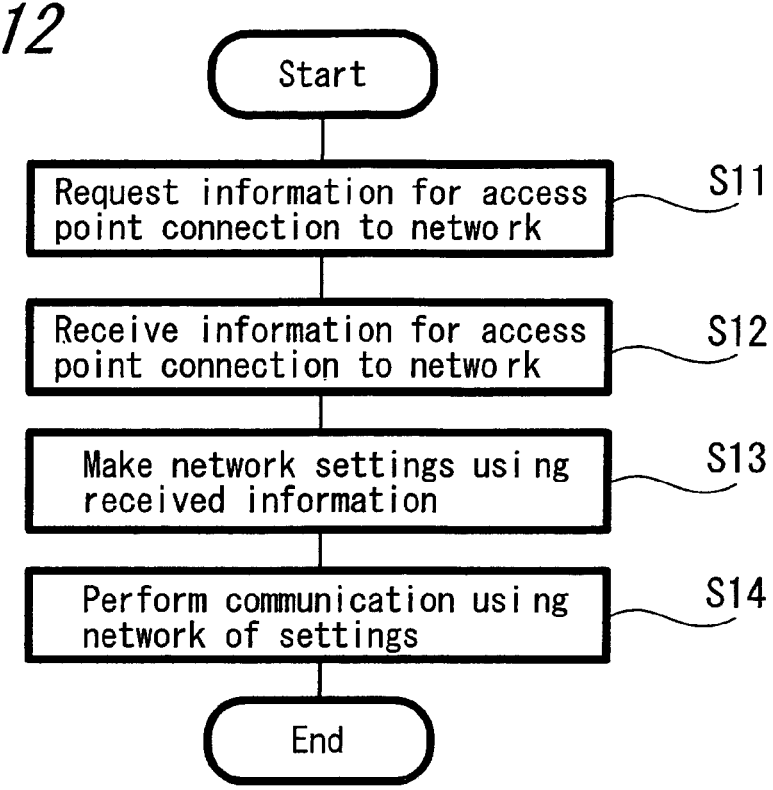
FIG. 12 is a flowchart showing operation of acquisition of parameters for access point connection to the network; and, FIG. 13 is a flowchart showing operation of acquisition of parameters for a local network device connection.

FIG. 12 is a flowchart showing parameter acquisition operation for access point connection to a network. The main component of operations is the CPU 61 of the device (1) 1.

In FIG. 12, in step S11 parameters for access point connection to the network are requested. Specifically, the CPU 61 of the device (1) 1 requests parameters 83 describing information for access point connection to the network 85 supported by the device (2) 4 within a predetermined communication area, in order to connect to an access point of the network 85 via the infrared interface 81. The parameters 83 of the device (2) 4 describe information for access point connection to the supported protocol network 85.

In step S12, parameters for access point connection to the network are received. Specifically, the device (2) 4 transfers the parameters 83 to the device (1) 1 within the predetermined communication area in the network, via the infrared interface 82, wherein information for access point connection to the supported network 85 is described in the parameter 83. The CPU 61 of the device (1) 1 acquires parameters describing information for access point connection to the supported network 85 from the device (2) 4, via the infrared interface 81.

In step S13, network settings are made using the received parameters. Specifically, the CPU 61 of the device (1) 1 performs transmission signal processing and reception signal processing via the IEEE 802.11b interface 3. The CPU 61 of the device (1) 1 sets parameters in the IEEE 802.11b interface 3 via the communication setting means. When test communication is possible via the communication means, the CPU 61 of the device (1) 1 sets communication information for access point connection to a network 85 described in parameters acquired by the infrared interface 81.

In step S14, communication is performed with the network for which settings have been made. Specifically, the CPU 61 of the device (1) 1 accesses the network 85 via the IEEE 802.11b access point 84 of the device (2) 4. The CPU 61 of the device (1) 1 performs communications with the network 85 via the IEEE 802.11b access point 84 of the device (2) 4.

By this means, communication settings are automatically made using the parameters of the IEEE 802.11b interface 3 for which test communication by the CPU 61 of the device (1) 1 was possible with the IEEE 802.11b interface 7 based on supported parameter information of the device (2) 4, and the CPU 61 of the device (1) 1 can perform communication with the network 85 via the IEEE 802.11b access point 84 of the device (2) 4.

Figure 10:
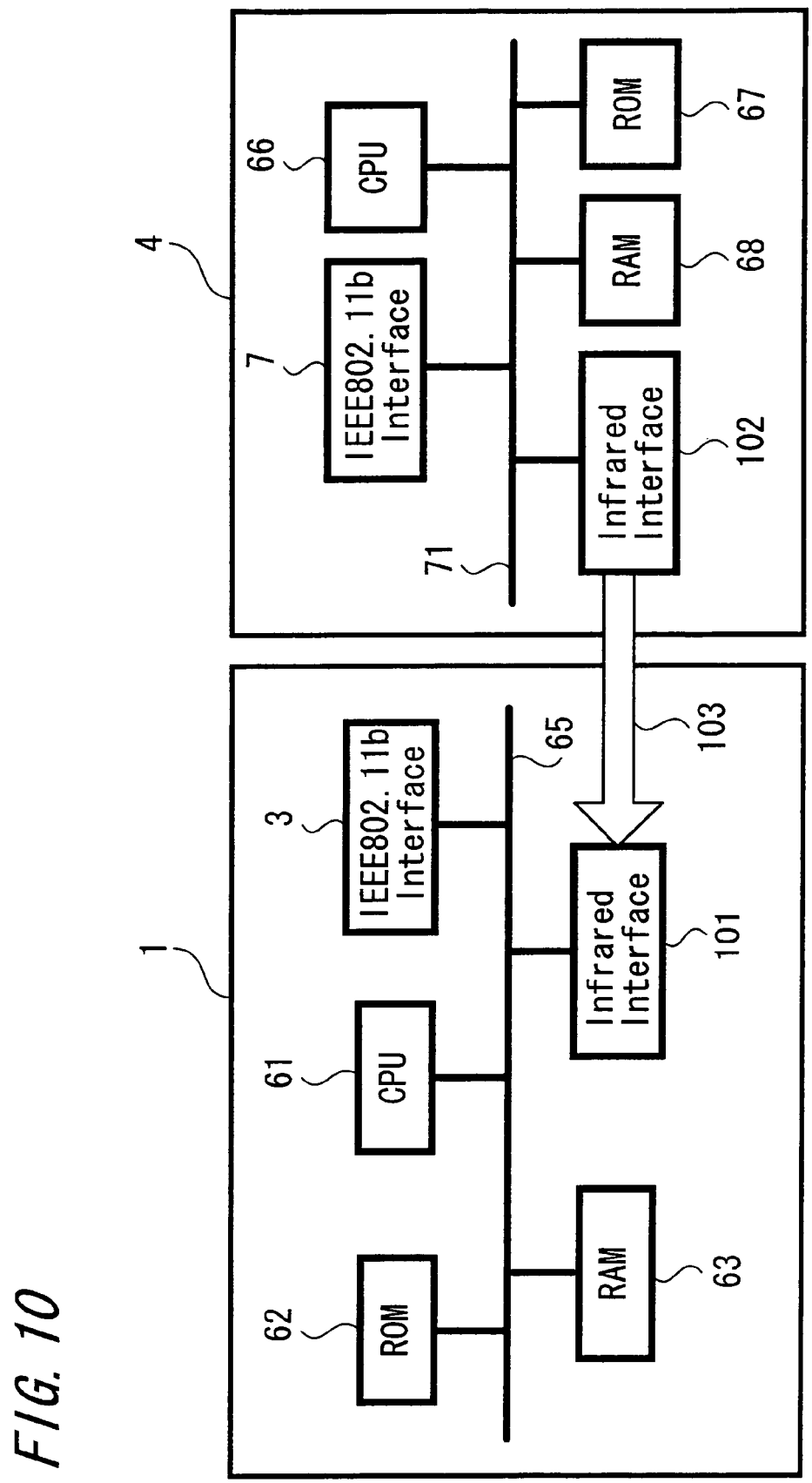
FIG. 10 shows parameter acquisition for local network device connection of device 2 by device 1, using an infrared interface.

FIG. 10 shows parameter acquisition for local network device connection to the device 4 by the device 1, using an infrared interface. FIG. 10 shows an ad hoc mode in which communication is performed with a device connected to a local network. The ad hoc mode is a mode of peer-to-peer communication between device units on a 1–1 basis, on an equal level in the local network, and without a master-slave relationship.

In FIG. 10, the device (1) 1 includes a CPU 61 which controls the device (1) 1; ROM 62 which stores the control program of the device (1) 1; RAM 63 which stores control data of the device (1) 1; an infrared interface 101 capable of acquiring parameters 83 described below from the device (2) 4, in a contact-free way; a bus 65; and an IEEE 802.11b interface 3 capable of wireless communication conforming to the IEEE 802.11b standard.

The device (2) 4 comprises a CPU 66 which controls the device (2) 4; ROM 67 which stores the control program of the device (2) 4; RAM 68 which stores control data of the device (2) 4; an infrared interface 102 capable of transmission of parameters 103 described below to the device (1) 1, in a contact-free way; a bus 71; and an IEEE 802.11b interface 7 capable of wireless communication conforming to the IEEE 802.11b standard.

Here, the infrared interface 101 of the device (1) 1 corresponds to the non-contact IC interface 2 shown in FIG. 1. The infrared interface 102 of the device (2) 4 corresponds to the non-contact IC interface 5 shown in FIG. 1. The device (1) 1 and the device (2) 4 constitute a local network capable of wireless communication conforming to the IEEE 802.11b standard.

In the device (1) 1 and device (2) 4 configured as described above, the operation by the device (1) 1 to acquire the parameters 103, described below, of the device (2) 4 is explained below.

In FIG. 10, the CPU 61 of the device (1) 1 executes the control program stored in the ROM 62 using the RAM 63, and the CPU 66 of the device (2) 4 executes the control program stored in the ROM 67 using the RAM 68, to cause the following operation.

The CPU 61 of the device (1) 1 requests the parameters 103, describing information for connection to the device (2) 4 within a predetermined communication area in the local network, via the infrared interface 101.

The parameters 103 of the device (2) 4 describe information for connection to a device of supported local networks. The device (2) 4 transfers, to the device (1) 1 within a predetermined communication area in a local network via the infrared interface 102, parameters 103 describing information for connection to a device of supported local networks.

The CPU 61 of the device (1) 1 acquires parameters describing information for connection to a device of supported local networks from the device (2) 4, via the infrared interface 101. The CPU 61 of the device (1) 1 performs transmission signal processing and reception signal processing via the IEEE 802.11b interface 3. The CPU 61 of the device (1) 1 sets parameters in the IEEE 802.11b interface 3 via the communication setting means. When test communication is possible via the communication means, the CPU 61 of the device (1) 1 makes communication settings of information for connection to the device of a local network described by the parameters acquired by the infrared interface 101. The parameters 103 are information to set specific communication conditions in order to set a communication protocol.

The CPU 66 of the device (2) 4 performs transmission signal processing and reception signal processing via the IEEE 802.11b interface 7. The CPU 66 of the device (2) 4 sets parameters in the IEEE 802.11b interface 7 via the communication setting means. When test communication is possible via the communication means, the CPU 66 of the device (2) 4 makes communication settings of information for connection to a device of a local network described in the parameters transferred by the infrared interface 102.

By this means, the CPU 61 of the device (1) 1 makes communication settings using the parameters of the IEEE 802.11b interface 3 for which test communication was possible by the CPU 61 of the device (1) 1 with the IEEE 802.11b interface 7 using the supported parameter information of the device (2) 4, and can perform communication conforming to the IEEE 802.11b standard with the device (2) 4 connected to a local network.

[Parameter Script File for Connection to Device of a Local Network]

Figure 11:
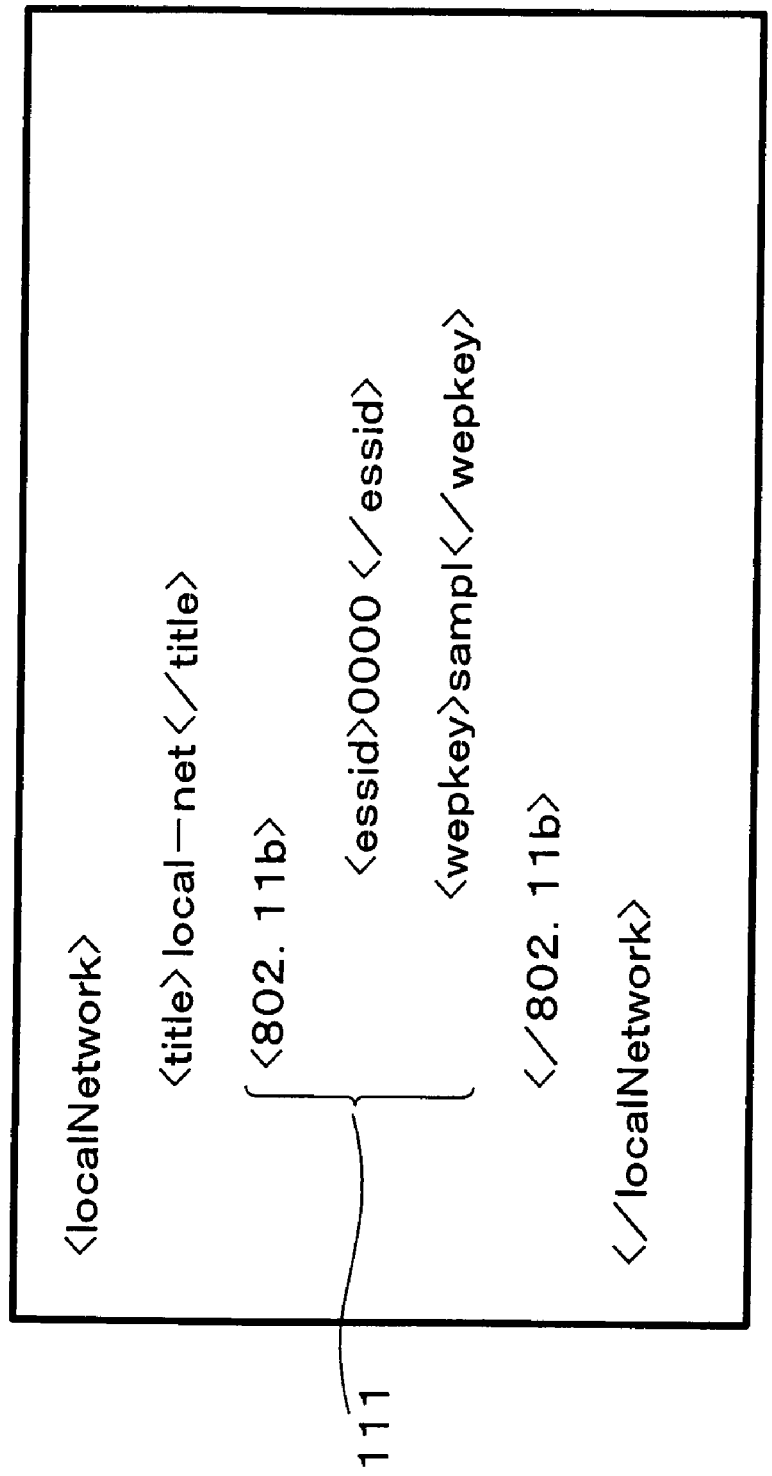
FIG. 11 shows a script file of parameters for local network device connection.

FIG. 11 shows a parameter script file for connection to the device of a local network described in the non-contact IC cards of the non-contact IC interface 2 of the device (1) and the non-contact IC interface 5 of the device (2) 4.

In FIG. 11, the parameter script file for connection to a device of the local network is configured as follows.

First, information relating to parameters for connection to the device of a local network is written in the <Localnetwork> element and indicates that the title is local-net. Next, as indicated by numeral 111, the <802.11b> element indicates that when the device (1) 1 performs communication conforming to the IEEE 802.11b standard with the device (2) 4 connected to a local network, as parameters for connection to the device of the local network, <essid> (service set identification)>0000 is set as an identification number of the communication group on the local network, and <wep (wire equivalent privacy) key>sampl is set as a password setting/decoding key equivalent to telephone lines. By this means, the device (1) 1 can use the parameters 111 to perform communication conforming to IEEE 802.11b with the device (2) 4 connected to the local network.

[Flowchart Showing Parameter Acquisition Operation for Connection to Device of a Local Network]

Figure 13:
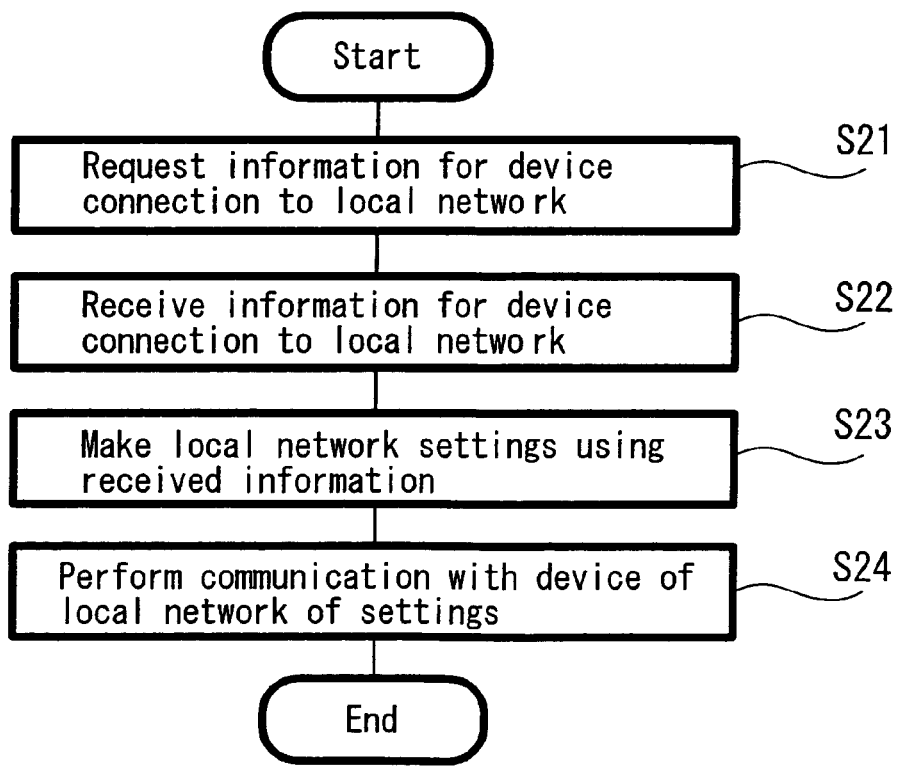

FIG. 13 is a flowchart showing parameter acquisition operation for connection to a device of a local network. The main component of the operations of FIG. 13 is the CPU 61 of the device (1) 1.

In FIG. 13, in step S21 parameters for connection to a device of the local network are requested. Specifically, the CPU 61 of the device (1) 1 requests, via the infrared interface 101, the parameters 103 describing information for connection to a device of a local network from the device (2) 4 within a predetermined communication area of the local network, in order to connect to a device of the local network. The parameters 103 of the device (2) 4 describe information for connection to the device of the local network.

In step S22, parameters are received for connection to a device of the local network. Specifically, the device (2) 4 transfers to the device (1) 1 within the predetermined communication area in the local network, via the infrared interface 102, parameters 103 describing information for connection to a device of the local network. The CPU 61 of the device (1) 1 acquires from the device (2) 4, via the infrared interface 101, parameters describing information for connection to the device of the local network.

In step S23, the received parameters are used to make settings for the local network. Specifically, the CPU 61 of the device (1) 1 performs transmission signal processing and reception signal processing via the IEEE 802.11b interface 3. The CPU 61 of the device (1) 1 sets parameters in the IEEE 802.11b interface 3 via the communication setting means. When test communication via the communication means is possible, the CPU 61 of the device (1) 1 makes communication settings of information for connection to the device of the local network described in parameters acquired from the infrared interface 81.

In step S24, communication with a device of the local network for which settings have been made is performed. Specifically, the CPU 61 of the device (1) 1 accesses the device (2) 4 of the local network. The CPU 61 of the device (1) 1 performs communication with the device (2) 4 of the local network.

By this means, communication settings are automatically made using the parameters of the IEEE 802.11b interface 3 for which test communication by the CPU 61 of the device (1) 1 was possible with the IEEE 802.11b interface 7 based on supported parameter information of the device (2) 4, and the CPU 61 of the device (1) 1 can perform communication with the device (2) 4 of the local network.

According to the above-described embodiment, in a device having an infrared interface and an interface for communication with another network, the information necessary when connecting to the network using a network communication interface can be obtained using the infrared interface, so that communication settings for connection to the network can be made automatically.

In the past, when forming a network using communication conforming to the IEEE 802.11b standard or wireless communication conforming to Bluetooth, the necessary information must be input; such information is a string of characters or similar, is difficult to understand, and input of which results in mistakes. Operations to make settings are complex, and a certain amount of knowledge of the network is necessary. However, according to the embodiment, manual input of the necessary information is not required, and network settings can be made automatically.

Further, there is no need to acquire in advance knowledge or methods of operation of the network in order to make settings; simply by using an infrared interface to obtain the necessary information, settings can be made automatically.

The above-described script files may use XML (extensible markup language).

In the above-described embodiment, an example is described in which communication conforming to the IEEE 802.11b standard is performed using parameter information; but the invention is not limited thereto, and application to wireless communication conforming to Bluetooth is also possible. In this case, of course, the information described in a non-contact IC card must be modified so as to support the communication standard of the network.

[Configuration of a Wireless LAN Conforming to IEEE 802.11]

A cell comprises wireless terminal devices capable of direct mutual communication. Each of the wireless terminal devices is provided with an address comprising a unique ID number in the IEEE 802.11 format. A plurality of cells are connected by a distributed network, and a collection of wireless terminal devices capable of indirect communication thereby is called an extended cell. Cells and distributed networks are connected by central control stations. Communication with other IEEE 802.11 LANs is performed using a connected device.

In a hierarchical model of an IEEE 802.11 wireless LAN protocol (communication procedure), as the physical layer which is the lowermost layer, specifications have been stipulated for the direct sequence-spread spectrum (DS-SS) method, frequency hopping (FH), orthogonal frequency division multiplexing (OFDM), and infrared (IR). Above the physical layer is provided an access control layer having a transmission medium absorption layer, in order to perform the same access control of these four transmission media.

In the above-described protocol hierarchy, the access control layer has distributed control and centralized control functions. The main functions for distributed control concern asynchronous packet transmission, communication control, security and the like. The basic access control method employs CSMA/CA. The procedures for data transfer are RTS (request to send), CTS (clear to send), data transmission, and ACK (acknowledgement). Functions for centralized control include adjustment of the transmission timing of different terminal devices, transmission with delay time limits, and power management taking account of cases in which wireless terminal devices operate under battery power.

Conforming to IEEE 802.11, a packet format comprises a wireless header and an access control packet. The wireless header comprises a preamble, frame synchronization, signal, service, MAC frame length, and header error check field (CRC16). An access control packet comprises a control packet (RTS, CTS) and a general packet of an access control layer. A control packet (RTS) comprises a frame control, media duration time, destination address, originating address, and frame error check field (CRC32). A control packet (CTS) comprises a frame control, media duration time, destination address, and frame error check field (CRC32). In general, a packet of the access control layer comprises a frame control, media duration time, cell ID, destination address, originating address, sequence number, fragment number, address, information field, and frame error check field (CRC32).

[Wireless Communication Block Conforming to Bluetooth]

In general, a master electronics device comprising a Bluetooth wireless communication block connects with a slave via a Bluetooth wireless communication. The master generally comprises, as the Bluetooth transmission/reception block, an antenna for reception and transmission of wireless signals conforming to the Bluetooth standard, an RF block which performs high-frequency signal processing of wireless transmission signals which are received and transmitted conforming to the Bluetooth standard, a baseband controller block which performs baseband signal processing for link establishment and control, a CPU which performs control relating to data division and assembly, flow control and other data transmission, and memory, including SRAM for storage of control data, and flash memory for storage of various parameters according to specifications.

In addition, the master has a bus control block which performs interfacing with a host controller, a display block for display of various information, buttons for input operations, speakers for audio output, and a microphone for audio input. Such a general-purpose Bluetooth transmission/reception block is used in transmission and reception. Slaves also have a similar Bluetooth transmission/reception block.

In the Bluetooth standard as a method of short-distance wireless data communication, using for example the 2.4 GHz frequency band, data transfer rates of from 64 kbps to 1 Mbps can be used.

In the above-described embodiments, examples have been described of short-distance wireless transmission between communication devices using the Bluetooth standard and the IEEE 802.11b standard; but this invention is not limited thereto, and may be applied to cases of wireless transmission using the wireless IEEE 1394 standard.

Below, RF tags and RF readers are explained.

[RF Tag Configuration]

A wireless tag employed as an RF tag uses a frequency of 13.56 MHz and enables communication between the tag and an RF reader, and in particular is a simplified tag having the construction of a six- or seven-layer tag 1.

A coil block is formed constituting an antenna inductance in a plastic material; the coil block is connected to a capacitor block comprising a three-layer structure, and an IC (integrated circuit) is mounted in the capacitor block.

The capacitor block is reinforced by plastic material, in a construction in which peelable paper covered with a pressure-sensitive bonding material is affixed to one face of the plastic body of the device; when the RF tag is to be affixed to the body of the device, by peeling away the peelable paper, the RF tag can be affixed to the body of the device by the pressure-sensitive bonding material.

On the surface opposite the surface on which the pressure-sensitive bonding material is affixed to the plastic material, that is, on the surface which is the surface when affixed to the body of the device, pressure-sensitive bonding material is applied to the plastic material, and this pressure-sensitive bonding material is covered with coating paper, and the upper surface of the coating paper is a surface for recording information. As a result, the RF tag has in all a six-layer construction, and in part a seven-layer construction.

[Block Diagram of an RF Tag]

The antenna receives radio waves from an RF reader, described below, and supplies signals corresponding to the received radio waves to a tuning circuit and to a power supply circuit. The tuning circuit extracts a carrier wave frequency used in communication between the RF tag and RF reader from the signal supplied by the antenna.

An amplifier circuit amplifies input signals to a predetermined level prior to output. A demodulation circuit demodulates signals which have been modulated at the carrier wave frequency, converting the signals into the corresponding predetermined data. A communication control circuit switches between data transmission and reception. A CPU controls each of the blocks according to a control program stored in ROM. Of the data supplied via the communication control circuit, data which must be stored is supplied as appropriate to an EEPROM (electrically erasable and programmable ROM).

The EEPROM stores data provided by the CPU. The modulation circuit modulates data supplied from the communication control circuit into signals at the carrier wave frequency, and outputs the signals. The amplifier circuit amplifies signals at the carrier wave frequency provided by the modulation circuit to the level necessary for communication. And, the antenna transmits by means of radio waves the signals at the carrier wave frequency amplified by the amplifier circuit.

Next, the operation of a tag with such a configuration is explained.

First, the processing procedure when radio waves transmitted from the RF reader are received and are stored in the EEPROM is explained. Radio waves from the RF reader which have been received by the antenna are converted into corresponding electrical signals, and are supplied to the tuning circuit. The tuning circuit extracts only those signals corresponding to a predetermined carrier wave frequency from among the signals supplied by the antenna, and supplies these signals to the amplifier circuit. The amplifier circuit amplifies the signals supplied by the tuning circuit to a predetermined level, and then supplies the signals to the demodulation circuit.

The demodulation circuit demodulates the signals supplied by the amplifier circuit, and supplies the result to the communication control circuit. In this case, after switching the communication control circuit to the reception mode and converting signals supplied by the demodulation circuit into digital data, the digital data is supplied to the CPU. Data supplied to the CPU by the communication control circuit is subjected to judgment as to whether the data should be stored by the CPU or not, and based on the judgment result, the data is supplied to and stored in the EEPROM as appropriate.

Electrical signals supplied by the antenna are also supplied to the power supply circuit. Here, by means of electromagnetic coupling with carrier waves transmitted from the RF reader, energy is removed, and necessary power is supplied to the various blocks. In this way, electric power is supplied from outside to the RF tag.

Next, operation in the case in which data (a command) from an RF reader supplied by the communication control circuit is a request for transmission of data stored in the EEPROM is explained. The CPU, upon receiving data (a command) corresponding to a request for data transmission via the communication control circuit, reads data stored in the EEPROM, and supplies the read data to the communication control circuit. The communication control circuit switches the operation mode to the transmission mode, and supplies the data supplied from the CPU to the modulation circuit.

The modulation circuit modulates the signals supplied by the communication control circuit at the carrier wave frequency, and supplies the result to the amplifier circuit. The signals supplied by the modulation circuit are amplified to the level necessary for communication. The signals amplified by the amplifier circuit are then transmitted via the antenna.

[RF Reader Block Diagram]

The antenna is capable of transmission and reception of a predetermined carrier wave, in order to transmit predetermined signals to an RF tag and perform communication with an RF tag. The antenna can also generate a magnetic field in order to supply power to an RF tag.

The tuning circuit is able to extract the carrier wave frequency used in communications between an RF tag and RF reader from signals supplied by the antenna. The amplifier circuit amplifies input signals to a predetermined level, and then outputs the signals. The demodulation circuit demodulates signals modulated at the carrier wave frequency, to convert the signals into predetermined data. The communication control circuit switches between data transmission and reception, and controls communications. The CPU controls each of the blocks according to a control program stored in ROM. Data supplied via the communication control circuit is supplied to RAM as appropriate.

The RAM stores data supplied by the CPU. The modulation circuit modulates data supplied by the communication control circuit to produce signals at the carrier wave frequency, which are output. The amplifier circuit amplifies signals modulated at the carrier wave frequency and supplied by the modulation circuit to the level necessary for communication. Then, the antenna transmits signals at the carrier wave frequency, amplified by the amplifier circuit, by means of radio waves.

Next, the operation of an RF reader configured in this way is explained.

First, operation in the case in which radio waves transmitted from an RF tag are received is explained. Radio waves from an RF tag which have been received by the antenna are converted into the corresponding electrical signals and supplied to the tuning circuit. The tuning circuit extracts only those signals at the predetermined carrier wave frequency among the signals supplied by the antenna, and supplies these signals to the amplifier circuit. The amplifier circuit amplifies the signals supplied by the tuning circuit to a predetermined level, and supplies these signals to the demodulation circuit.

The demodulation circuit demodulates the signals modulated at the carrier wave frequency, and supplies the result to the communication control circuit. The communication control circuit switches to the reception mode, and after converting signals supplied by the demodulation circuit into digital data, supplies the digital data to the CPU. The CPU stores the data supplied by the communication control circuit temporarily in RAM. Then, the data is transmitted to an external circuit via a communication line, not shown.

Next, operation in the case in which a data transmission request occurs, and predetermined data is transmitted from an RF reader to an RF tag is explained. In this case, data to be stored in an RF tag or similar is transmitted as necessary from an external circuit to the CPU via a communication line. The CPU supplies data supplied via the communication line or data stored in RAM to the communication control circuit.

The communication control circuit, after converting data supplied by the CPU into analog signals, supplies the signals to the modulation circuit. The modulation circuit modulates the signals supplied by the communication control circuit at a predetermined carrier wave frequency, and supplies the result to the amplifier circuit. The amplifier circuit amplifies the signals supplied by the modulation circuit to the level necessary for communication, and transmits the signals via the antenna.

Signals transmitted via the antenna are received by the antenna of the RF tag, and as described above, are written to EEPROM. In this way, data can be transmitted and received between an RF tag and an RF reader.

[Explanation of Mutual Electromagnetic Inductive Coupling]

An example is explained in which the antenna of the RF tag comprises a coil, and the antenna of the RF reader comprises a coil. The coil of the RF tag and the coil of the RF reader are arranged such that mutual electromagnetic inductive coupling occurs.

In the RF tag, a diode is connected in series to the coil, and this diode is further connected to a resistor and capacitor, to form a resonance circuit with the coil. By means of this resonance circuit, a tuning circuit is formed.

The capacitor is connected in parallel to a series circuit of a resistor and a FET (field effect transistor). The FET gate is controlled by a gate sequencer. One end of the diode is connected, via the capacitor, to the gate sequencer, and is also connected to a power supply circuit.

On the side of the reader/writer, an oscillation circuit and demodulation circuit are connected in parallel with the coil.

In this configuration example, an oscillation circuit for data transmission is not provided on the side of the RF tag; data transmission is performed by having the gate sequencer change the FET impedance according to the transmission data. At this time, the impedance in the direction of the FET changes across the ends of the coil, and as a result the impedance of the coil of the RF reader, which is inductively coupled, also changes. The demodulation circuit detects fluctuations in the current and voltage across the ends of the coil, and demodulates the signals from the RF reader.

In the case in which data is transmitted from the RF reader, the frequency of oscillation of the oscillation circuit changes with the data. These changes are transmitted by inductive coupling from the coil of the RF reader to the coil of the RF tag, and the signals are input to the gate sequencer via a capacitor. By this means, the gate sequencer can receive signals from the RF reader.

As described above, communication between the RF tag and RF reader employs the principles of electromagnetic induction and mutual inductive coupling; and the supply of power to the RF tag is realized by inducing an induction current in the coil of the RF tag through electromagnetic induction.

[Explanation of State of Use]

A state in which the above-described RF tag is mounted on a desktop personal computer, and data transfer to an IC within an RF reader mounted on a portable telephone or notebook personal computer, is explained. When a portable telephone or notebook computer capable of communication using another protocol and with an RF reader mounted is brought into proximity with a desktop personal computer capable of communication using a certain protocol and another protocol and with an RF tag mounted, the RF reader mounted on the portable telephone or notebook personal computer acquires a protocol list, describing supported protocol information, from the RF tag mounted on the desktop personal computer. The portable telephone or notebook personal computer performs test communication based on the protocol information described in the protocol list, and, using a protocol with which it has been confirmed that test communication is possible, the portable telephone or notebook personal computer performs communication with the desktop personal computer.

Next, the infrared interface is explained.

[irDA Communication System]

An irDA communication system uses an infrared interface. irDA standard specifications are divided into two: the irDA Data standards, which address data transfer between personal computers and portable terminals, and the irDA Control standards, which address control of personal computers, digital appliance products and similar. The irDA Data standards are standards for one-to-one data communications between adjacent information devices. By replacing serial and parallel communication between such devices with bidirectional infrared communications, the irDA Data standards enable simple wireless connections over short communication distances of approximately 1 meter.

The irDA Data standards comprise physical layer standards, which stipulate the physical specifications of infrared transceiver blocks, modulation/demodulation methods and other basics of communication; data link layer standards, to control communications in order to provide a penetrating and reliable communication path between devices; and upper-layer standards to realize various applications.

A number of communication rules necessary for data communications are stipulated in the data link layer. The irLAP (infrared link access protocol) and irLMP (infrared link management protocol) are data link layer protocols of the irDA Data standards; implementation of these protocols is essential.

The irLAP protocol stipulates nearly all the important communication control, including discovery of remote stations, control of half-duplex unequal communications (methods in which one terminal is a parent station and the other is a child station, and the parent station controls transmission rights), procedures for the detection and recovery of communication faults, procedures to determine optimum communication rates between stations, communication packet lengths, and similar. On the other hand, the irLMP protocol stipulates multiplex functions providing a plurality of data connections to the upper layer over a single established transmission path, as well as the method of inquiry of service functions between stations.

The irDA Control standards address functions for wireless personal computer input peripherals such as mice, keyboards and joysticks, digitization of home appliances such as television receivers and video recorders, and advanced functionality for remote commanders in conjunction with networks, and targets device control and exchange of small amounts of information. The irDA Control standards use bidirectional infrared communication to realize a plurality of input/output device connections to a single personal computer or a digital appliance over long distances and a broad communication range comparable to that of remote commanders. There is no interoperability between irDA Data standards and irDA Control standards, and communication therebetween is not possible.

irDA Control standards also comprise physical layer standards, which stipulate the physical specifications of the infrared transceiver block, modulation/demodulation methods, and other basics of communication, and data link layer standards to control one-to-N communications.

irDA Control systems comprise one host and a plurality of peripherals (up to 8 units). For example, a personal computer may be a host, and personal computer input peripherals such as mice, keyboards, joysticks and similar may operate as peripherals.

The data link layer of the irDA Control standards is designed, in this system, to enable simultaneous infrared data communication between the host and a plurality of peripherals. The host performs polling for each of the peripherals, and controls communication with the peripherals. Only when a peripheral receives a poll packet from the host, it permitted to transmit a packet in response.

A transmission and reception device of this invention, which performs transmission signal processing and transmission of input signals from a transmission device within a network, and which performs reception signal processing and output of signals received in a reception device within the network, comprises protocol request means, which requests supported protocol information of the reception device within a predetermined communication area in the network; protocol acquisition means, which acquires supported protocol information from the reception device; interface means, which performs transmission signal processing and reception signal processing; test communication means, which performs test communication using the interface means; and communication means, which, when test communication by the test communication means is possible, performs communication using a protocol of the protocol information acquired by the protocol acquisition means. Consequently there is the advantageous result that a transmission and reception device can be provided such that, by preparing an arrangement to start another protocol, assignment of protocol roles is possible; when the device supports a plurality of protocols, by stating the order of priority thereof, the optimal protocol can be used to perform communication; only the type of protocol need be described, and the respective protocols can follow the detailed rules of the various protocols; and, the supported protocol information and address of the target device can be acquired by a simple operation, so that communication can be performed using a supported protocol.

In the above-described transmission and reception device of this invention, information for a plurality of protocols is provided with associated priorities, so that there is the advantageous result that the optimum protocol among the plurality of provided protocols with associated priorities can be used to perform communication.

In the above-described transmission and reception device of this invention, switching from protocols with higher priority to protocols with lower priority is possible, so that there is the advantageous result that by switching from a high-priority to a low-priority protocol, the optimum protocol can be used to perform communication.

Further, a transmission and reception method of this invention which performs transmission signal processing and transmission of input signals from a transmission device within a network, and which performs reception signal processing and output of signals received in a reception device within the network, comprises a protocol request step of requesting supported protocol information of the reception device within a predetermined communication area in the network; a protocol acquisition step of acquiring supported protocol information from the reception device; an interface step of performing transmission signal processing and reception signal processing; a test communication step of performing test communication using the interface step; and a communication step of, when test communication by the test communication step is possible, performing communication using a protocol of the protocol information acquired by the protocol acquisition step. Consequently there are the advantageous results that, by preparing an arrangement to start another protocol, assignment of protocol roles is possible; when the device supports a plurality of protocols, by stating the order of priority thereof, the optimal protocol can be used to perform communication; only the type of protocol need be described, and the respective protocols can follow the detailed rules of the various protocols; and, the supported protocol information and address of the target device can be acquired by a simple operation, so that communication can be performed using a supported protocol.

In the above-described transmission and reception method of this invention, a plurality of protocols are provided with associated priorities, so that there is the advantageous result that the optimum protocol can be used among the plurality of protocols with associated priorities to perform communication.

In the above-described transmission and reception method of this invention, switching from high-priority to low-priority protocols is possible, so that there is the advantageous result that by switching from a high-priority to a low-priority protocol, the optimum protocol can be used to perform communication.

Further, a transmission and reception system of this invention, which performs transmission signal processing and transmission of input signals from a transmission device within a network, and which performs reception signal processing and output of signals received in a reception device within the network, comprises both a transmission device, having protocol request means, which requests supported protocol information of a reception device within a predetermined communication area in the network; protocol acquisition means, which acquires supported protocol information from the reception device; interface means, which performs transmission signal processing and reception signal processing; test communication means, which performs test communication using the interface means; and communication means, which, when test communication by the test communication means is possible, performs communication using a protocol of the protocol information acquired by the protocol acquisition means; and also a reception device, having storage means, which stores supported protocol information; protocol transfer means, which transfers supported protocol information to a transmission device within a predetermined communication area of the network; interface means, which performs transmission signal processing and reception signal processing; and communication means, which performs communication using a protocol of the protocol information stored in the storage means. Consequently there is the advantageous result that a transmission and reception system can be provided such that, by preparing an arrangement to start another protocol, assignment of protocol roles is possible; when the device supports a plurality of protocols, by stating the order of priority thereof, the optimal protocol can be used to perform communication; only the type of protocol need be described, and the respective protocols can follow the detailed rules of the various protocols; and, the supported protocol information and address of the target device can be acquired by a simple operation, so that communication can be performed using a supported protocol.

INDUSTRIAL APPLICABILITY

This invention can be used in transmission and reception devices, transmission and reception methods, and transmission and reception systems in which, for example, transmitted information is received, and the received signals are output.

DESCRIPTION OF REFERENCE NUMERALS

1 DEVICE 1
2 NON-CONTACT IC INTERFACE
3 IEEE 802.11b INTERFACE
4 DEVICE 2
5 NON-CONTACT IC INTERFACE
6 BLUETOOTH INTERFACE
7 IEEE 802.11b INTERFACE
8 PROTOCOL INFORMATION
21 PROTOCOL
31 PROTOCOL
32 PROTOCOL
41 PRIORITY 1
42 PROTOCOL
43 PRIORITY 2
44 PROTOCOL
45 PRIORITY 3
46 PROTOCOL
61 CPU
62 ROM
63 RAM
64 RF READER
65 BUS
66 CPU
67 ROM
68 RAM
69 RF READER
70 PROTOCOL LIST
81 INFRARED INTERFACE
82 INFRARED INTERFACE
83 PARAMETER
84 IEEE 802.11b ACCESS POINT
85 NETWORK
91 PARAMETER
101 INFRARED INTERFACE
102 INFRARED INTERFACE
103 PARAMETER
111 PARAMETER

What is claimed is:

1. An information processing apparatus for communicating with another information processing apparatus via plural interfaces, comprising:
    first interface means for performing a close-range communication with said other information processing apparatus to acquire supported protocol information stored in said other information processing apparatus;
    second interface means having one or more second interfaces for performing communications conforming to one or more network protocols;
    candidate protocol determining means for determining a candidate network protocol from the one or more network protocols to perform communications via a second interface from said second interface means based on the supported protocol information acquired from said other information processing apparatus;
    trial communication means for performing a trial communication, using said candidate network protocol determined by said candidate protocol determining means, via said second interface; and
    network communication means for communicating via said second interface using said candidate network protocol when said trial communication is successful;
    wherein, if said trial communication fails and said second interface means has another second interface, said trial communication means performs another trial communication using said candidate network protocol via the other second interface.

2. The information processing apparatus according to claim 1, wherein the supported protocol information includes priorities associated with the one or more network protocols.

3. The information processing apparatus according to claim 2, wherein said candidate network protocol is determined on the basis of the priorities associated with the one or more network protocols.

4. The information processing apparatus according to claim 1, wherein said first interface means includes a non-contact integrated circuit interface.

5. The information processing apparatus according to claim 1, wherein said first interface means includes an infrared data communication interface.

6. The information processing apparatus according to claim 1, wherein said second interface means includes an IEEE 802.11b interface.

7. The information processing apparatus according to claim 1, wherein said second interface means includes a Bluetooth interface.

8. The method according to claim 1, wherein said first interface means includes an infrared data communication interface.

9. A method of communicating between an information processing apparatus and another information processing apparatus via plural interfaces, the information processing apparatus including a first interface for performing a close-range communication and second interface means having one or more second interfaces for performing communications conforming to one or more network protocols; the method comprising the steps of:
    a supported protocol acquiring step of performing said close-range communication between said first interface on said information processing apparatus and said other information processing apparatus to acquire supported protocol information stored in said other information processing apparatus;
    a candidate protocol determining step of determining a candidate network protocol from the one or more network protocols to perform communications via a second interface from said second interface means based on the supported protocol information acquired from said other information processing apparatus;

a trial communication step of performing a trial communication, using said candidate network protocol determined in said candidate protocol determining step, via said second interface; and a network communication step of communicating via said second interface using said candidate network protocol when said trial communication is successful;

wherein, if said trial communication fails and said second interface means has another second interface, said trial communication step performs another trial communication using said candidate network protocol via the other second interface.

10. The method according to claim 9, wherein the supported protocol information includes priorities associated with the one or more network protocols.

11. The method according to claim 10, wherein said candidate network protocol is determined on the basis of the priorities associated with the one or more network protocols.

12. The method according to claim 9, wherein said first interface includes a non-contact integrated circuit interface.

13. The method according to claim 9, wherein said second interface means includes an IEEE 802.11b interface.

14. The method according to claim 9, wherein said second interface means includes a Bluetooth interface.

* * * * *